United States Patent
Long et al.

(10) Patent No.: US 11,249,607 B2
(45) Date of Patent: Feb. 15, 2022

(54) INCELL SELF-CAPACITIVE TOUCH DISPLAY SUBSTRATE WITH HALLOWED-OUT PORTIONS

(71) Applicant: BOE TECHNOLOGY GROUP CO., LTD., Beijing (CN)

(72) Inventors: Chunping Long, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/810,092

(22) Filed: Mar. 5, 2020

(65) Prior Publication Data

US 2021/0141489 A1 May 13, 2021

(30) Foreign Application Priority Data

Nov. 13, 2019 (CN) .......................... 201921955339.1

(51) Int. Cl.
*G06F 3/044* (2006.01)
*G09G 3/36* (2006.01)
*G02F 1/1362* (2006.01)
*G02F 1/1333* (2006.01)

(52) U.S. Cl.
CPC ........ *G06F 3/0446* (2019.05); *G02F 1/13338* (2013.01); *G02F 1/136286* (2013.01); *G09G 3/3688* (2013.01); *G06F 2203/04111* (2013.01)

(58) Field of Classification Search
CPC ......... G06F 3/0446; G06F 2203/04111; G06F 3/04164; G06F 3/0443; G06F 3/0412; G09G 3/3688; G02F 1/136286; G02F 1/13338
See application file for complete search history.

(56) References Cited

U.S. PATENT DOCUMENTS

2017/0212623 A1* 7/2017 Park .................. G02F 1/134336
2018/0260058 A1* 9/2018 Zhan ...................... G06F 3/047

* cited by examiner

*Primary Examiner* — David D Davis
(74) *Attorney, Agent, or Firm* — Brooks Kushman P.C.

(57) ABSTRACT

A touch display substrate includes: a base substrate, a common electrode layer on the base substrate, a plurality of touch data lines, and a touch detection chip. The touch detection chip is connected with each of the self-capacitive electrodes through a corresponding one of the touch data lines and configured to load a common electrode signal to each of the self-capacitive electrodes in a display period through the corresponding touch data line. The touch detection chip is also configured to determine a touch position in a touch period by detecting a change in a capacitance of each of the self-capacitive electrodes through the corresponding touch data line.

18 Claims, 7 Drawing Sheets

INCELL SELF-CAPACITIVE TOUCH DISPLAY SUBSTRATE WITH HALLOWED-OUT PORTIONS

CROSS-REFERENCE TO RELATED APPLICATION

This application claims priority to Chinese Patent Application No. 201921955339.1 filed on Nov. 13, 2019, which is incorporated herein by reference in its entirety.

TECHNICAL FIELD

The present disclosure relates to the field of display product manufacturing technology, and in particular to an incell self-capacitive touch display substrate and a touch display device.

BACKGROUND

At present, conventional incell touch screens adopt a principle of mutual capacitance or self capacitance to detect a touch position of a finger. Among them, the touch screen adopting the self-capacitive principle may include a plurality of self-capacitive electrodes, which are arranged in a same layer and insulated from each other. When a human body does not touch the screen, a capacitance of each of the capacitive electrodes is at a fixed value. When the human body touches the screen, the capacitance of the corresponding self-capacitive electrode is at the sum of the fixed value plus a human body capacitance, and a touch detection chip can determine the touch position by detecting a change in the capacitance of the corresponding self-capacitive electrode in a touch period. Since the human body capacitance can act on all of the self capacitances, as compared with a case that the human body capacitance can act only on a projected capacitance in the case of the mutual capacitance, a touch variation amount caused by the human body touching the screen will be greater than that of the touch screens made on the principle of mutual capacitance. Thus, as compared with the touch screens made on the principle of mutual capacitance, the touch screens made on the principle of self capacitance can effectively improve a signal-to-noise ratio of the touch, so as to improve accuracy of touch sensing.

However, in the structural design of the incell self-capacitive touch screen as described above, a new film layer needs to be added inside the existing display substrate, resulting in the need to add a new process when manufacturing the display substrate, which increases the production cost and is not conducive to the improvement of production efficiency.

SUMMARY

In a first aspect, embodiments of the present disclosure provide a touch display substrate including: a base substrate, having a plurality of pixel regions arranged in the form of an array; a common electrode layer on the base substrate, divided into a plurality of self-capacitive electrodes independent from each other, an orthogonal projection of each of the self-capacitive electrodes on the base substrate covering more than one of the pixel regions; a plurality of touch data lines, arranged in a different layer from the self-capacitive electrodes and each connected with a corresponding one of the self-capacitive electrodes, orthogonal projections of the touch data lines on the base substrate being located within gaps between the plurality of pixel regions; and a touch detection chip, connected with each of the self-capacitive electrodes through a corresponding one of the touch data lines, and configured to load a common electrode signal to each of the self-capacitive electrodes in a display period through the corresponding touch data line, and to determine a touch position in a touch period by detecting a change in a capacitance of each of the self-capacitive electrodes through the corresponding touch data line.

According to some optional embodiments of the present disclosure, the base substrate includes a plurality of gate lines and a plurality of data lines, the plurality of gate lines and the plurality of data lines intersect to define the plurality of pixel regions, two of the gate lines are arranged between two adjacent rows of the pixel regions, two columns of the pixel regions are located between two adjacent ones of the data lines, and each column of the pixel regions is provided with one of the data lines on one side and with one common electrode line, which is also used as the touch data line, on the other side.

According to some optional embodiments of the present disclosure, the base substrate includes a plurality of gate lines and a plurality of data lines, the plurality of gate lines and the plurality of data lines intersect to define the plurality of pixel regions, one of the gate lines is arranged between two adjacent rows of the pixel regions, one of the data lines and one of the touch data lines are arranged between two adjacent columns of the pixel regions, and the touch data lines are also used as common electrode lines.

According to some optional embodiments of the present disclosure, the touch data lines are in a same layer as the data lines, and an extension direction of the touch data line is substantially the same as an extension direction of the data line.

According to some optional embodiments of the present disclosure, the touch data lines are in a same layer as the data lines, and an extension direction of the touch data line is substantially the same as an extension direction of the data line.

According to some optional embodiments of the present disclosure, the touch display substrate further includes dummy touch data lines which are arranged in parallel with and in a same layer as the touch data lines, and each of the touch data lines corresponds to one of the dummy touch data lines.

According to some optional embodiments of the present disclosure, at least two of the touch data lines are shorted by means of a connection line which is located outside a display region.

According to some optional embodiments of the present disclosure, each of the self-capacitive electrodes includes a plurality of first hollowed-out portions and a plurality of second hollowed-out portions. Specifically, the first and second hollowed-out portions are evenly distributed. The first orthogonal projections of the plurality of second hollowed-out portions on the base substrate are located within second orthogonal projections which are orthogonal projections of the data lines and the touch data lines on the base substrate. Moreover, orthogonal projections of the first hollowed-out portions on the base substrate are located within areas where the pixel regions are.

According to some optional embodiments of the present disclosure, the first hollowed-out portion and the second hollowed-out portion have a same shape, and both of them are of a strip structure extending along a direction substantially parallel to an extension direction of the data line.

According to some optional embodiments of the present disclosure, the touch display substrate is an incell self-capacitive LCD display substrate.

In a second aspect, embodiments of the present disclosure further provide a touch display device including an incell self-capacitive touch display substrate. The incell self-capacitive touch display substrate includes: a base substrate, a common electrode layer on the base substrate, a plurality of touch data lines, and a touch detection chip. The base substrate has a plurality of pixel regions arranged in the form of an array. The common electrode layer is divided into a plurality of self-capacitive electrodes independent from each other, an orthogonal projection of each of the self-capacitive electrodes on the base substrate covering more than one of the pixel regions. The plurality of touch data lines is arranged in a different layer from the self-capacitive electrodes and each connected with a corresponding one of the self-capacitive electrodes, orthogonal projections of the touch data lines on the base substrate being located within gaps between the plurality of pixel regions. The touch detection chip is connected with each of the self-capacitive electrodes through a corresponding one of the touch data lines and configured to load a common electrode signal to each of the self-capacitive electrodes in a display period through the corresponding touch data line. The touch detection chip is also configured to determine a touch position in a touch period by detecting a change in a capacitance of each of the self-capacitive electrodes through the corresponding touch data line.

According to some optional embodiments of the present disclosure, the base substrate includes a plurality of gate lines and a plurality of data lines. The plurality of gate lines and the plurality of data lines intersect to define the plurality of pixel regions. Two of the gate lines are arranged between two adjacent rows of the pixel regions. Two columns of the pixel regions are located between two adjacent ones of the data lines. Each column of the pixel regions is provided with one of the data lines on one side and with one common electrode line. The one common electrode line is also used as the touch data line on the other side.

According to some optional embodiments of the present disclosure, the base substrate includes a plurality of gate lines and a plurality of data lines, the plurality of gate lines and the plurality of data lines intersect to define the plurality of pixel regions, one of the gate lines is arranged between two adjacent rows of the pixel regions, one of the data lines and one of the touch data lines are arranged between two adjacent columns of the pixel regions, and the touch data lines are also used as common electrode lines.

According to some optional embodiments of the present disclosure, the touch data lines are in a same layer as the data lines, and an extension direction of the touch data line is substantially the same as an extension direction of the data line.

According to some optional embodiments of the present disclosure, the touch data lines are in a same layer as the data lines, and an extension direction of the touch data line is substantially the same as an extension direction of the data line.

According to some optional embodiments of the present disclosure, the touch display device further includes dummy touch data lines which are arranged in parallel with and in a same layer as the touch data lines, and each of the touch data lines corresponds to one of the dummy touch data lines.

According to some optional embodiments of the present disclosure, at least two of the touch data lines are shorted by means of a connection line which is located outside a display region.

According to some optional embodiments of the present disclosure, each of the self-capacitive electrodes includes a plurality of first hollowed-out portions and a plurality of second hollowed-out portions. Specifically, the first and second hollowed-out portions are evenly distributed. The first orthogonal projections of the plurality of second hollowed-out portions on the base substrate are located within second orthogonal projections which are orthogonal projections of the data lines and the touch data lines on the base substrate. Moreover, orthogonal projections of the first hollowed-out portions on the base substrate are located within areas where the pixel regions are.

According to some optional embodiments of the present disclosure, the first hollowed-out portion and the second hollowed-out portion have a same shape, and both of them are of a strip structure extending along a direction substantially parallel to an extension direction of the data line.

According to some optional embodiments of the present disclosure, the touch display substrate is an incell self-capacitive LCD display substrate.

BRIEF DESCRIPTION OF THE DRAWINGS

In order to illustrate the technical solutions of the embodiments of the present disclosure more apparently, the accompanying drawings required in the description of the embodiments of the present disclosure will be briefly introduced below. It is evident that the drawings used in the following description relate to only some embodiments of the present disclosure, and based on these drawings, the other drawings can be obtained by those of ordinary skill in the art without exercising any inventive work.

DETAILED DESCRIPTION

Figure 1:
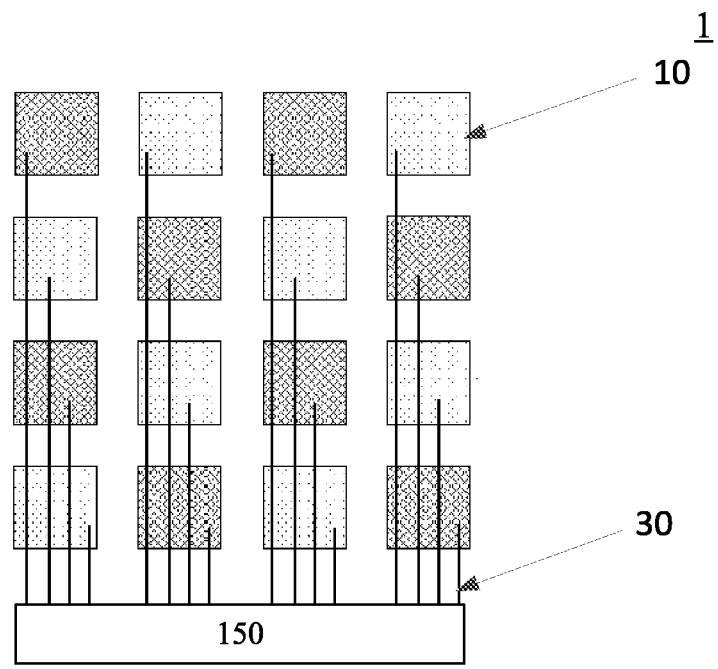
FIG. 1 is a schematic diagram showing a distribution of self-capacitive electrodes according to some embodiments of the present disclosure.

In order to make the objects, technical solutions, and advantages of the embodiments of the present disclosure more apparent, the technical solutions of the embodiments of the present disclosure will be clearly and completely described hereinafter with reference to the accompanying drawings for the embodiments of the present disclosure. Obviously, the described embodiments are a part, rather than all, of the embodiments of the present disclosure. Based on the described embodiments of the present disclosure, all the other embodiments obtained by those of ordinary skill in the art fall within the protection scope of the present disclosure.

In the description of the present disclosure, it should be noted that terms such as "center", "top", "bottom", "left", "right", "vertical", "horizontal", "inside" and "outside" that indicate orientation or positional relationships are used based on the orientation or positional relationships shown in the drawings, and are merely for facilitating and simplifying the description of the present disclosure, rather than for indicating or implying that a device or element referred to must have a specific orientation or be configured and operated in the specific orientation, and thus should not be construed as limiting the present disclosure. In addition, the terms "first", "second" and "third" are merely used for explanatory purposes, and should not be construed as indicating or implying relative importance.

In view of the problem that the incell self-capacitive touch display structure requires an additional film layer, resulting in the need to add a new process when manufacturing the display substrate, which increases the production cost and is not conducive to the improvement of production efficiency, embodiments of the present disclosure provide an incell self-capacitive touch display substrate in which the common electrode layer is divided into self-capacitive electrodes and which is capable of achieving the self-capacitive touch based on the existing manufacturing process of the display substrate, without the need to add any additional film layer. As a result, the production cost is effectively saved and the production efficiency is greatly improved.

Specifically, this embodiment provides an incell self-capacitive touch display substrate. As shown in FIGS. 1 to 10, the incell self-capacitive touch display substrate includes: a base substrate 1, having a plurality of pixel regions arranged in the form of an array; a common electrode layer on the base substrate 1, divided into a plurality of self-capacitive electrodes 10 independent from each other, an orthogonal projection of each of the self-capacitive electrodes 10 on the base substrate 1 covering more than one of the pixel regions; a plurality of touch data lines 30, arranged in a different layer from the self-capacitive electrodes 10 and each connected with a corresponding one of the self-capacitive electrodes 10, orthogonal projections of the touch data lines 30 on the base substrate 1 being located within gaps between the plurality of pixel regions; and a touch detection chip 150 (see FIG. 1), connected with each of the self-capacitive electrodes 10 through a corresponding one of the touch data lines 30 and configured to load a common electrode signal to each of the self-capacitive electrodes 10 in a display period through the corresponding touch data line 30, and to determine a touch position in a touch period by detecting a change in a capacitance of each of the self-capacitive electrodes 10 through the corresponding touch data line 30.

By using the common electrode layer as the self-capacitive electrodes 10 as well on the principle of self capacitance, a pattern of the common electrode layer is changed and divided into the plurality of self-capacitive electrodes 10 independent from each other. Moreover, the touch data lines 30 each connecting a corresponding one of the self-capacitive electrodes 10 and the touch detection chip 150 are provided on the base substrate 1, and orthogonal projections of all of the touch data lines 30 on the base substrate 1 are located within areas where gaps between the plurality of pixel regions are and will be blocked by a black matrix in the touch screen. Since the gaps between the pixel regions are not used for display, the aperture ratio of pixels will not be affected. Furthermore, the touch detection chip 150 can determine the touch position in the touch period by detecting the change in the capacitance of the corresponding self-capacitive electrode 10. Since in the touch screen provided in this embodiment, the structure of the common electrode layer is changed and divided into the self-capacitive electrodes 10, and the touch data lines 30 and the data lines 20 can be formed in a same patterning process, there is no need to add any additional process on the basis of the existing manufacturing process of the array substrate, which effectively saves the production cost and greatly improves the production efficiency.

In a specific implementation of this embodiment, the base substrate 1 includes a plurality of gate lines 40 and a plurality of data lines 20, the plurality of gate lines 40 and the plurality of data lines 20 intersect to define the plurality of pixel regions, two of the gate lines 40 are arranged between two adjacent rows of the pixel regions, two columns of the pixel regions are located between two adjacent ones of the data lines 20, and each column of the pixel regions is provided with one of the data lines 20 on one side and with one common electrode line, which is also used as the touch data line 30, on the other side, as shown in FIGS. 2 to 7. In this way, it is not necessary to fabricate the touch data lines through a specific patterning process, which can simplify the structure and manufacturing process of the display substrate, and effectively reduce the production cost of the display substrate.

In this implementation, a structure of a thin film transistor is located within each of the pixel regions of the base substrate 1 between the common electrode layer and the base substrate, the touch data lines 30 and the data lines 20 are in the same layer, the touch data line 30 is also used as the common electrode line on the other side of each column of the pixel regions, and an extension direction of the touch data line 30 is substantially the same as that of the data line 20.

In this implementation, each of the pixel regions further includes a pixel electrode 70, which is in a different layer from the common electrode layer. A passivation layer is located between the pixel electrode 70 and the common electrode layer. The thin film transistor includes a gate electrode 500, a source electrode 100 and a drain electrode 200. The source electrode 100 is connected to the data line 20, the drain electrode 200 is connected to the pixel electrode 70, the gate line 40 and the data line 20 are connected by crossing each other, and one of the data lines 20 is connected to the thin film transistors and the pixel electrodes 70 in corresponding two columns of the pixel regions. That is, one data line 20 drives the pixel regions on both sides of this data line 20 at the same time, such that the number of the data lines 20 on the base substrate 1 is reduced by half.

Figure 2:
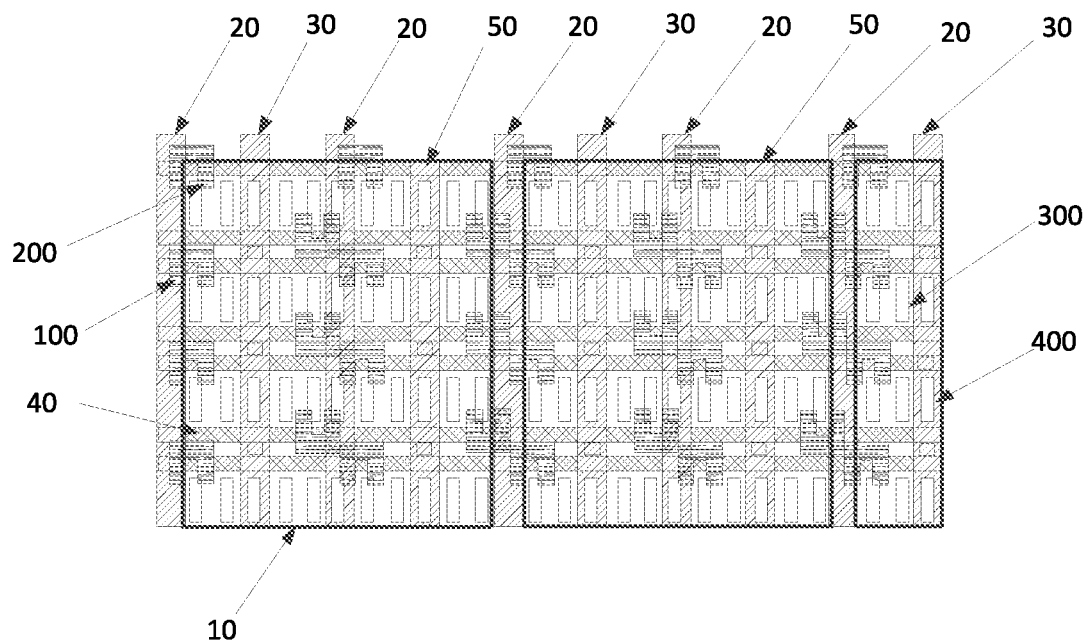
FIG. 2 is a first schematic structural diagram illustrating a touch display substrate according to one implementation of many embodiments of the present disclosure.
Figure 3:
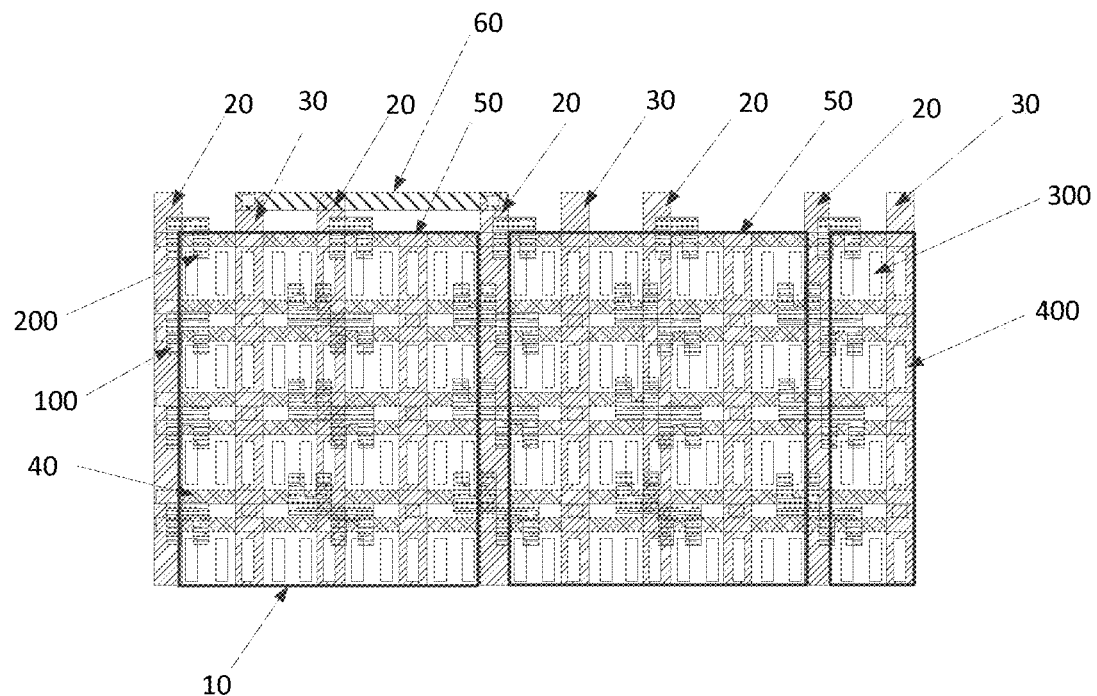
FIG. 3 is a second schematic structural diagram illustrating a touch display substrate according to one implementation of many embodiments of the present disclosure.
Figure 4:
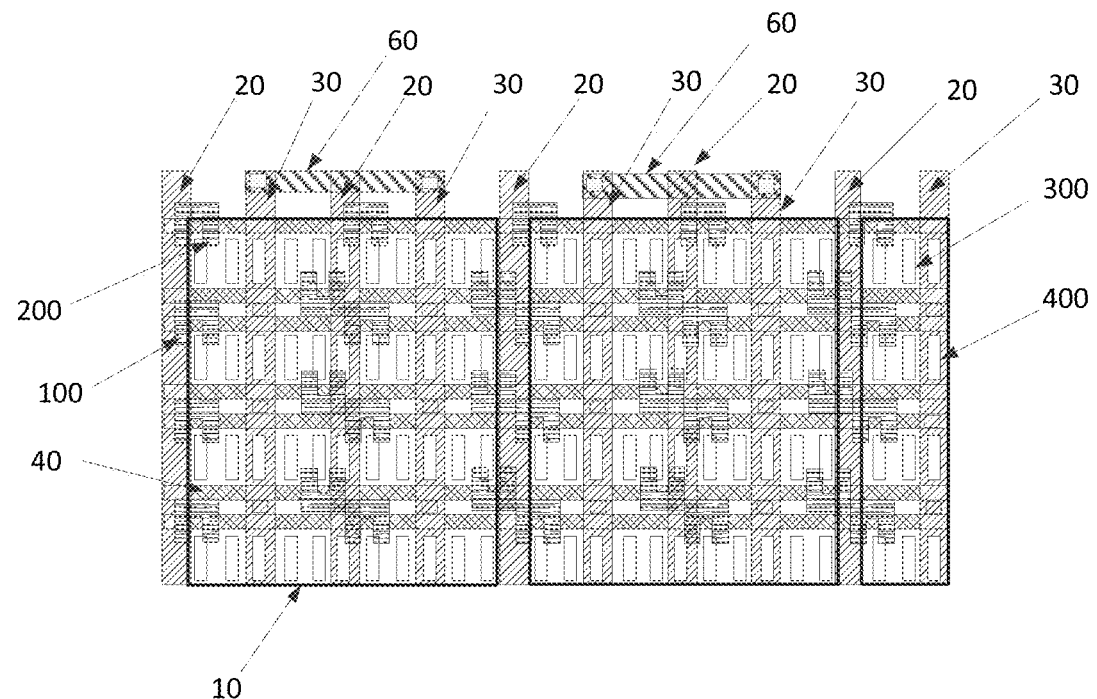
FIG. 4 a third schematic structural diagram illustrating a touch display substrate according to one implementation of many embodiments of the present disclosure.

In this implementation, each of the touch data lines 30 is connected to the touch detection chip 150. Alternatively, at least two of the touch data lines 30 may be shorted by means of a connection line 60, and the two shorted touch data lines 30 are connected to the touch detection chip 150 through the connection line 60 which is located outside a display region. FIG. 2 is a schematic diagram illustrating a case that the touch data lines 30 are not shorted, and FIGS. 3 and 4 are schematic diagrams illustrating the shorting of two touch data lines 30. Shorting at least two of the touch data lines 30 can reduce the number of wirings, significantly simplify the structure of the display substrate and effectively reduce the production cost of the display substrate.

In this implementation, referring to FIGS. 2 and 3, the touch display substrate further includes dummy touch data lines 50 which are arranged in parallel with and in a same layer as the touch data lines 30, and each of the touch data lines 30 corresponds to one of the dummy touch data lines 50.

In this implementation, each of the self-capacitive electrodes 10 includes a plurality of first hollowed-out portions 300 and a plurality of second hollowed-out portions 400, which are evenly distributed, and first orthogonal projections of the plurality of second hollowed-out portions 400 on the base substrate 1 are located within second orthogonal projections which are orthogonal projections of the data lines 20 and the touch data lines 30 on the base substrate 1, and orthogonal projections of the first hollowed-out portions 300 on the base substrate 1 are located within areas where the pixel regions are. One of the self-capacitive electrodes 10 corresponds to more than one of the pixel regions, and a connection pattern, which extends in an interior area of the self-capacitive electrode 10 from a side of the touch data line 30 above the gate line, is connected to the common electrode via a contact hole, referring to FIG. 6. In addition, the first hollowed-out portion 300 is located between the touch data line 30 and the dummy touch data line 50, and the second hollowed-out portion 400 is located above the touch data line 30 and the data line 20.

Further, the arrangement of the first hollowed-out portions 300 and the second hollowed-out portions 400 is beneficial to maintaining the uniformity of spatial arrangement of slits of the common electrode layer, which is conducive to forming evenly-distributed self capacitances, reducing noise of a touch signal, and improving the detection sensitivity of the touch position.

There may be various specific shapes for the first hollowed-out portions 300 and the second hollowed-out portions 400. In this implementation, the first hollowed-out portion 300 and the second hollowed-out portion 400 have a same shape, and both are of a strip structure extending along a direction parallel to an extension direction of the data line 20, and are not limited thereto.

Figure 5:
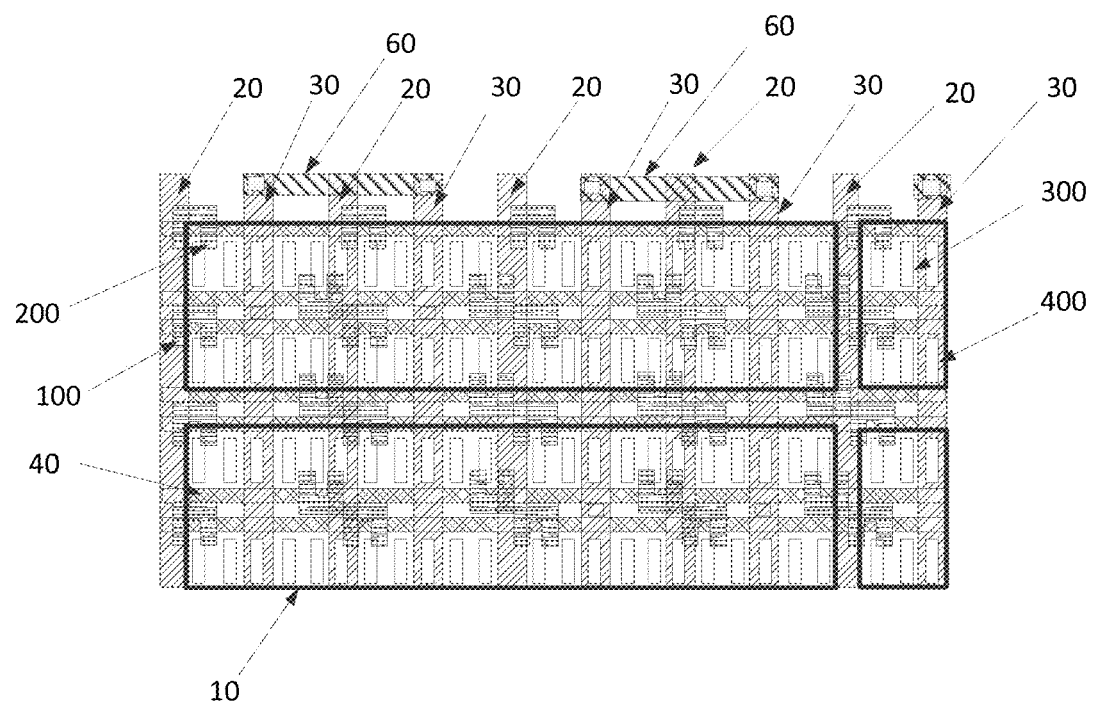
FIG. 5 is a fourth schematic structural diagram illustrating a touch display substrate according to one implementation of many embodiments of the present disclosure.

It should be noted that FIG. 1 shows that the self-capacitive electrodes 10 are connected to corresponding different touch data lines, and one of the self-capacitive electrodes 10 is connected to one touch data line 30, but it should be understood that in a practical application, each self-capacitive electrode 10 is not limited to being connected to only one touch data line 30, but may be connected to multiple touch data lines 30. For example, one self-capacitive electrode 10 is connected to two touch data lines 30, as shown in FIG. 5.

Figure 8:
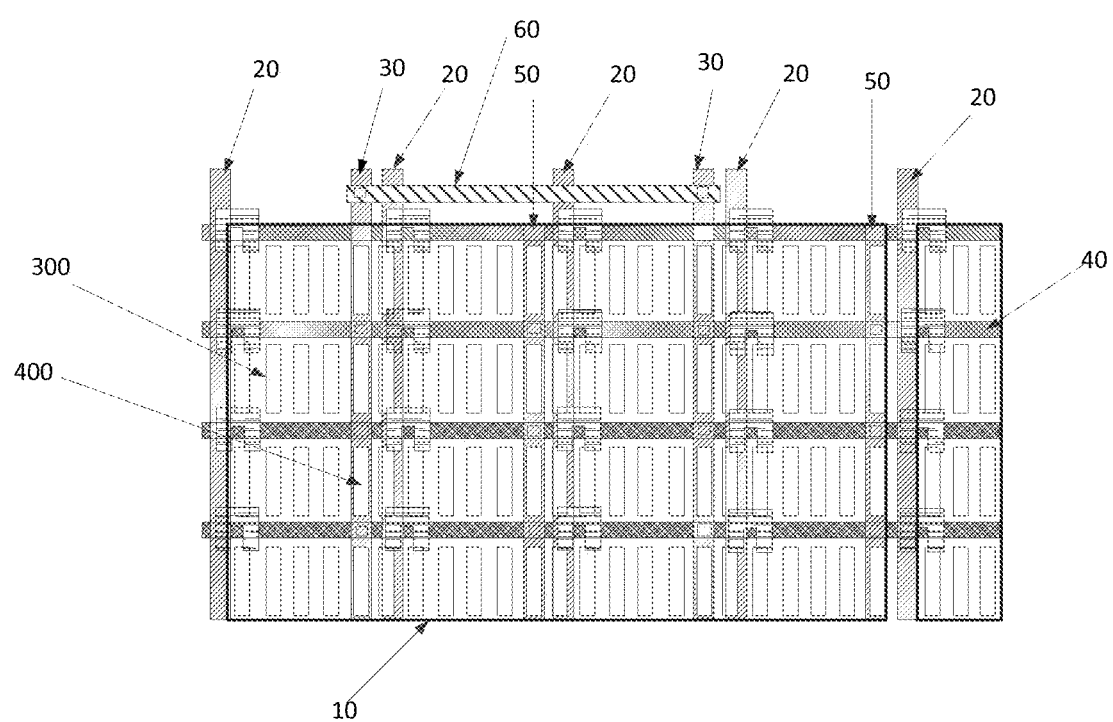
FIG. 8 is a first schematic structural diagram illustrating a touch display substrate according to another implementation of many embodiments of the present disclosure.
Figure 9:
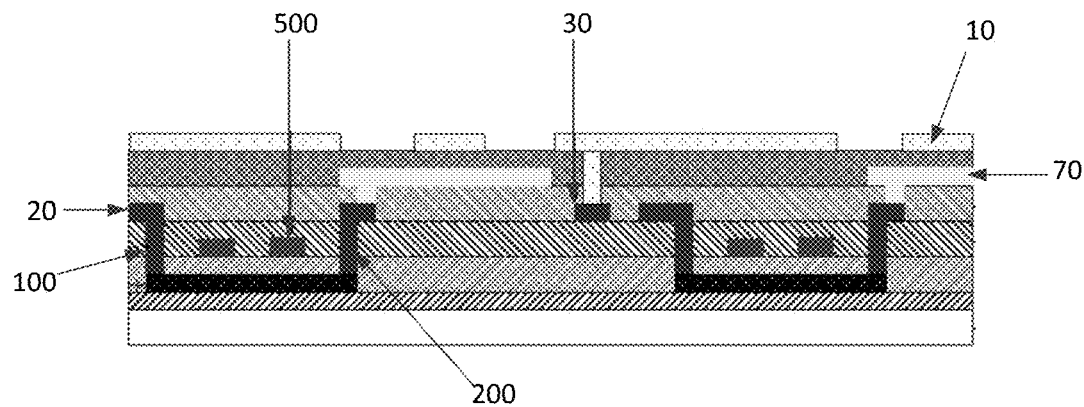
FIG. 9 is a second schematic structural diagram illustrating a touch display substrate according to another implementation of many embodiments of the present disclosure.
Figure 10:
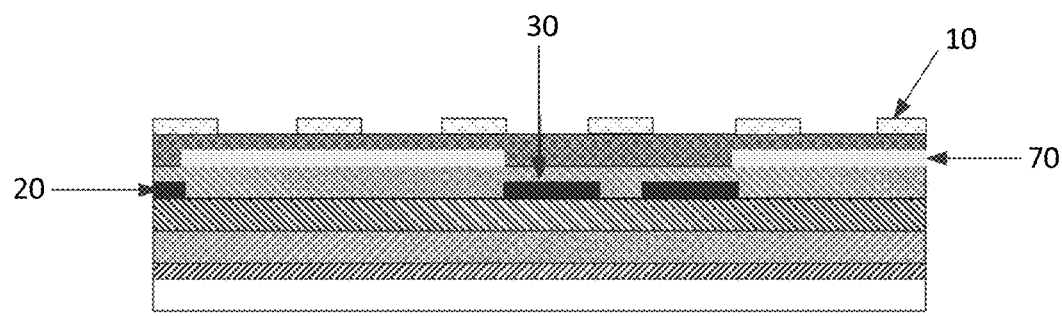
FIG. 10 is a third schematic structural diagram illustrating a touch display substrate according to another implementation of many embodiments of the present disclosure.

In another implementation of this embodiment, the base substrate 1 includes a plurality of gate lines 40 and a plurality of data lines 20, the plurality of gate lines 40 and the plurality of data lines 20 intersect to define the plurality of pixel regions, one of the gate lines 40 is arranged between two adjacent rows of the pixel regions, one of the data lines 20 and one of the touch data lines 30 are arranged between two adjacent columns of the pixel regions, and the touch data lines 30 are also used as common electrode lines, as shown in FIGS. 8 to 10.

In this implementation, a structure of a thin film transistor is located within each of the pixel regions of the base substrate 1 under the common electrode layer, the touch data lines 30 and the data lines 20 are in the same layer, the touch data line 30 is also used as the common electrode line in a display stage, and an extension direction of the touch data line 30 is substantially the same as that of the data line 20.

Figure 6:
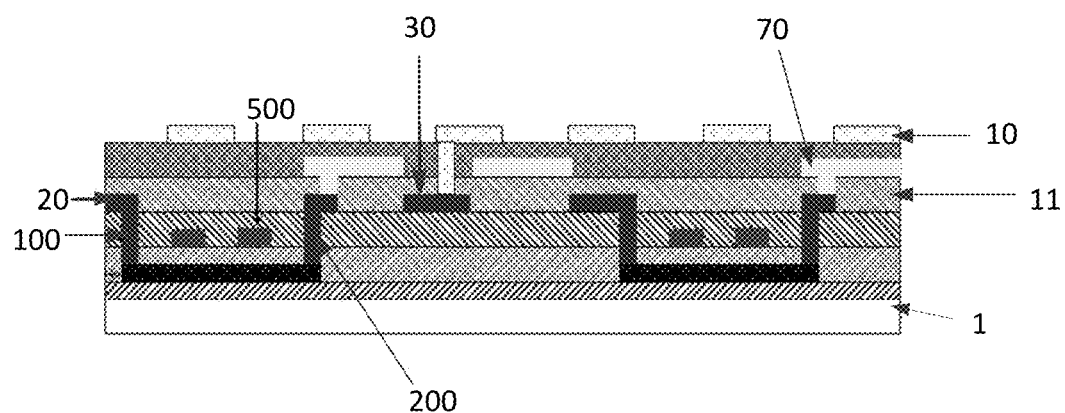
FIG. 6 is a fifth schematic structural diagram illustrating a touch display substrate according to one implementation of many embodiments of the present disclosure.
Figure 7:
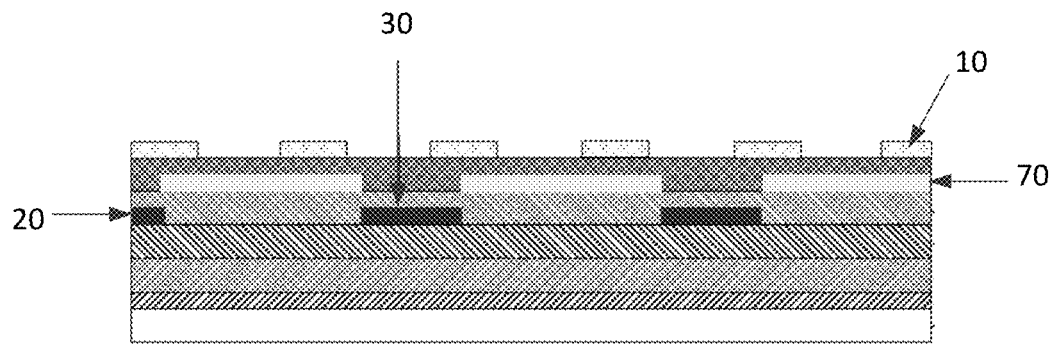
FIG. 7 is a sixth schematic structural diagram illustrating a touch display substrate according to one implementation of many embodiments of the present disclosure.

In this implementation, each of the pixel regions further includes a pixel electrode 70, which is in a different layer from the common electrode layer. A passivation layer is located between the pixel electrode 70 and the common electrode layer. The thin film transistor includes a gate electrode 500, a source electrode 100 and a drain electrode 200. As shown in FIGS. 6 and 9, the source electrode 100 is connected to the data line 20, the drain electrode 200 is connected to the pixel electrode 70, and the gate line 40 and the data line 20 are connected by crossing each other, and one of the data lines 20 is connected to the thin film transistor and the pixel electrode 70 in a corresponding one column of the pixel regions.

In this implementation, each of the touch data lines 30 is connected to the touch detection chip 150. Or alternatively, at least two of the touch data lines 30 may be shorted by means of a connection line 60, and the two shorted touch data lines 30 are connected to the touch detection chip 150 through the connection line 60 which is located outside the display region. FIG. 8 is a schematic diagram illustrating the shorting of two touch data lines 30.

In this implementation, referring to FIG. 8, the touch display substrate further includes dummy touch data lines 50 which are arranged in parallel with and in a same layer as the touch data lines 30, and each of the touch data lines 30 corresponds to one of the dummy touch data lines 50.

In this implementation, each of the self-capacitive electrodes 10 includes a plurality of first hollowed-out portions 300 and a plurality of second hollowed-out portions 400, which are evenly distributed, and first orthogonal projections of the plurality of second hollowed-out portions 400 on the base substrate 1 are located within second orthogonal projections which are orthogonal projections of the data lines 20 and the touch data lines 30 on the base substrate 1, and orthogonal projections of the first hollowed-out portions 300 on the base substrate 1 are located within areas where the pixel regions are. One of the self-capacitive electrodes 10 corresponds to more than one of the pixel regions, and a connection pattern, which extends in an interior area of the self-capacitive electrode 10 from a side of the touch data line 30 above the gate line, is connected to the common electrode via a contact hole, referring to FIG. 9. In addition, the first hollowed-out portion 300 is located between the touch data line 30 and the dummy touch data line 50, and the second hollowed-out portion 400 is located above the touch data line 30 and the data line 20.

Further, the arrangement of the first hollowed-out portions 300 and the second hollowed-out portions 400 is beneficial to maintaining the uniformity of spatial arrangement of slits of the common electrode layer, which is conducive to forming evenly-distributed self capacitances, reducing noise of a touch signal, and improving the detection sensitivity of the touch position.

There may be various specific shapes for the first hollowed-out portions 300 and the second hollowed-out portions 400. In this implementation, the first hollowed-out portion 300 and the second hollowed-out portion 400 have a same shape, and both are of a strip structure extending along a direction parallel to an extension direction of the data line 20, and are not limited thereto.

This embodiment further provides a display device including the above-mentioned incell self-capacitive touch display substrate.

When the display device is applied to a liquid crystal display (LCD), the display screen includes an array substrate on which the common electrode layer, the touch data lines, the data lines, the gate lines, the pixel electrodes, and the like are arranged, but the touch display device can also be applied to other display structures, and is not limited to the structure described herein.

By using the common electrode layer as the self-capacitive electrodes as well on the principle of self capacitance, the pattern of the common electrode layer is changed and divided into the plurality of self-capacitive electrodes independent from each other. Moreover, the touch data lines each connecting a corresponding one of the self-capacitive electrodes and the touch detection chip 150 are provided on the base substrate, and orthogonal projections of all of the touch data lines on the base substrate are located within areas where gaps between the plurality of pixel regions are and will be blocked by a black matrix in the touch screen (i.e., the orthogonal projections of the touch data lines on the array substrate are located within the orthogonal projection of the black matrix on the array substrate), and the aperture ratio of pixels will not be affected. Furthermore, the touch detection chip 150 can determine the touch position in the touch period by detecting the change in the capacitance of the corresponding self-capacitive electrode. Since in the touch display substrate provided in this embodiment, the structure of the common electrode layer is changed and divided into the self-capacitive electrodes, and the touch data lines formed of a metal in the same layer as the data lines are used, there is no need to add any additional process on the basis of the existing manufacturing process of the array substrate, which effectively saves the production cost and greatly improves the production efficiency.

The display device may be any product or component having a display function, such as a liquid crystal television, a liquid crystal display (LCD), a digital photo frame, a mobile phone, and a tablet computer. The display device further includes a flexible circuit board, a printed circuit board (PCB), and a backplane.

The base substrate in this embodiment may be a flexible substrate such as glass or PI (polyimide film).

The following is a manufacturing process of a pixel region on an array substrate of an LCD to which the touch display substrate in this embodiment is applied.

Figure 11:
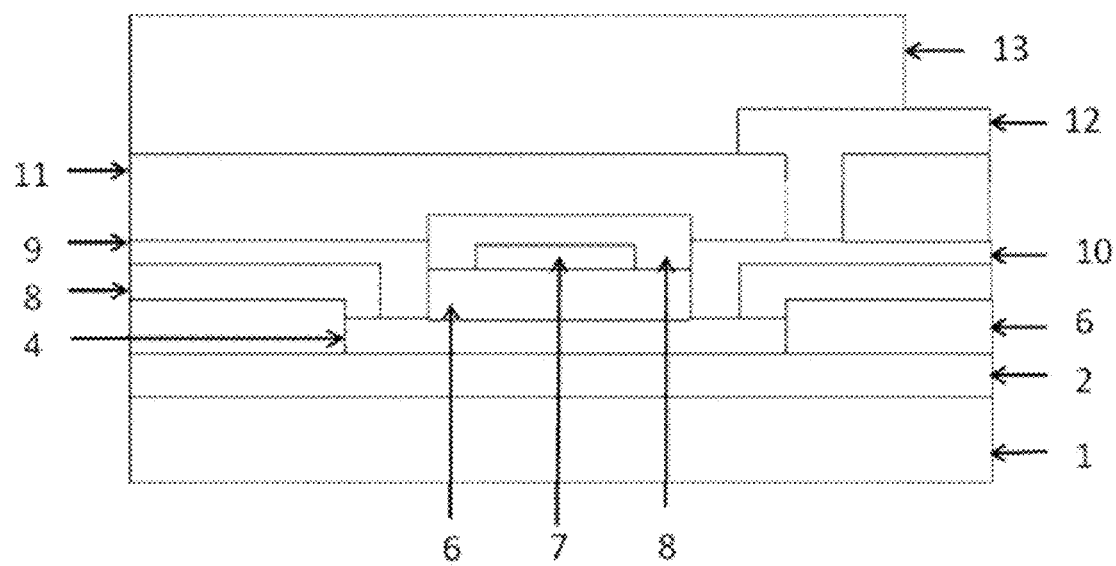
FIG. 11 is a schematic structural diagram illustrating an array substrate according to some embodiments of the present disclosure.

FIG. 11 is a schematic diagram showing a low temperature polysilicon field effect thin film transistor (TFT) array substrate. A thin film transistor is formed in the display region as shown in any of FIGS. 2 to 5, and the display region further includes a plurality of data lines and a plurality of gate lines distributed in the form of an array. In a process for manufacturing the low temperature polysilicon field effect thin film transistor array substrate, eight (8) to nine (9) masking processes are typically needed. The process for manufacturing the low temperature polysilicon field effect thin film transistor array substrate shown in FIG. 11 will be described below with reference to FIGS. 12A to 12G.

Figure 12A:
FIG. 12A is a first schematic diagram showing a part of the structure of the array substrate provided during its manufacturing process according to some embodiments of the present disclosure.

As shown in FIG. 12A, a silicon nitride (SiN) film and a silicon dioxide ($SiO_2$) film are sequentially deposited on an entire insulating substrate (a base substrate) 1 by plasma enhanced chemical vapor deposition (PECVD) so as to form a buffer layer 2 composed of silicon nitride and silicon dioxide. Next, an amorphous silicon (a-Si) film is formed on the buffer layer 2 by using PECVD or other chemical or physical vapor deposition processes. By means of excimer laser annealing (ELA) or solid phase crystallization (SPC), the a-Si film is crystallized into a polysilicon film. Then, a pattern in a photoresist layer is formed on the polysilicon film by using a conventional masking process. With the photoresist layer being used as an etching barrier layer, a portion of the polysilicon film that is not protected by the photoresist layer is etched by using plasma to form a polysilicon active layer 4 and a polysilicon storage capacitor 3 (a part of the plasma-etched polysilicon film is used as the active layer of the TFT, the other part thereof is used as a bottom electrode of the storage capacitor, and a top electrode of the storage capacitor is formed of a gate metal). A transistor channel in the polysilicon active layer 4 is doped with ions at a low concentration by using an ion implantation process, so as to form a conductive channel in the polysilicon active layer 4, which is required by the field effect thin film transistor.

Figure 12B:
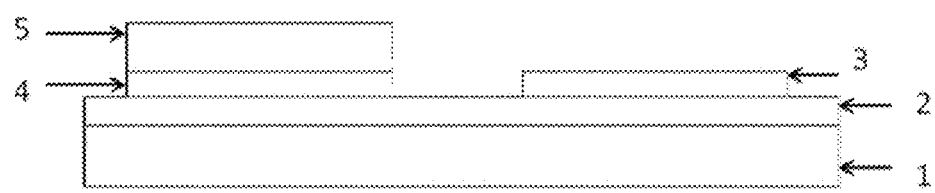
FIG. 12B is a second schematic diagram showing a part of the structure of the array substrate provided during its manufacturing process according to some embodiments of the present disclosure.
Figure 12C:
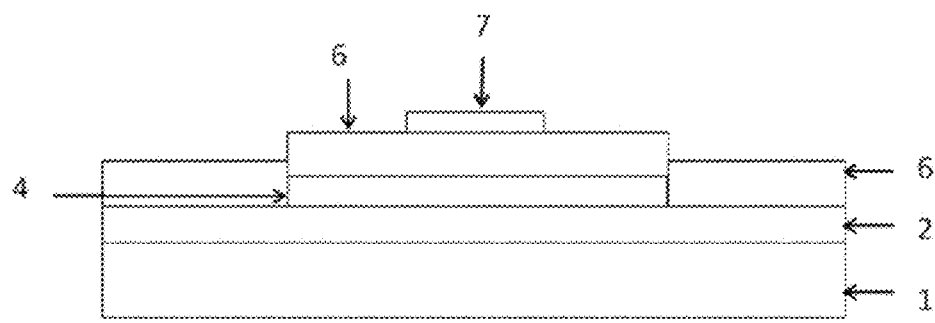
FIG. 12C is a third schematic diagram showing a part of the structure of the array substrate provided during its manufacturing process according to some embodiments of the present disclosure.

As shown in FIG. 12B, a photoresist layer 5 composed of a photo-resistive material is formed on the polysilicon active layer 4 through a masking process so as to protect the polysilicon active layer 4 from ion implantation. The polysilicon storage capacitor 3 that is not protected by the photoresist layer is subjected to a high-concentration ion implantation process to convert the polysilicon storage capacitor 3 into a low-resistance doped polysilicon film. During subsequent processes shown in FIGS. 12C to 12G, since a second electrode plate of the capacitor composed of a gate insulating layer and a gate metal film is formed only on the polysilicon storage capacitor 3, the only subsequent photolithographic process for the polysilicon storage capacitor 3, i.e., the photolithographic process for forming the second electrode plate of the capacitor, is no longer shown in FIGS. 12C to 12G.

As shown in FIG. 16C, the photoresist layer 5 on the polysilicon active layer 4 is removed by a photoresist peeling process, and a SiO$_2$ film or a composite film of SiO$_2$ and SiN is deposited by PECVD to form a gate insulating layer 6 on the polysilicon storage capacitor 3, the polysilicon active layer 4 and the entire buffer layer 2. One or more low-resistance metal material films are deposited on the gate insulating layer 6 by a physical vapor deposition process such as magnetron sputtering, and a gate electrode 7 is formed by a photolithographic process. The gate metal film may be a single-layer metal film such as Al, Cu, Mo, Ti or AlNd, or may be a multi-layer metal film such as Mo/Al/Mo or Ti/Al/Ti. With the gate electrode 7 being used as an ion implantation barrier layer, the polysilicon active layer 4 is doped with ions such that a low-impedance contact region of a source electrode and a drain electrode is formed in a region of the polysilicon active layer that is not blocked by the gate electrode.

Figure 12D:
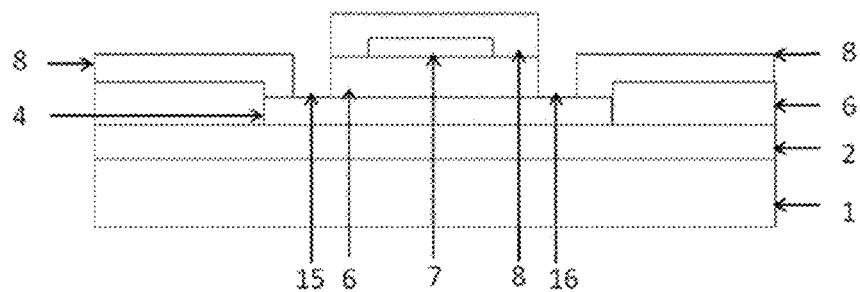
FIG. 12D is a fourth schematic diagram showing a part of the structure of the array substrate provided during its manufacturing process according to some embodiments of the present disclosure.
Figure 12E:
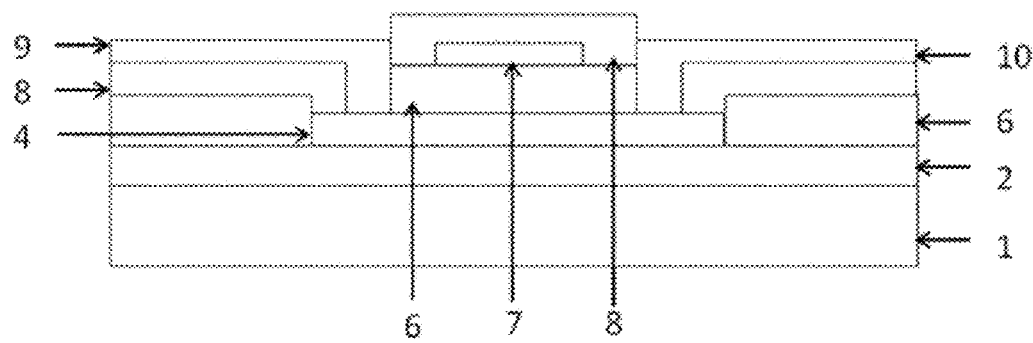
FIG. 12E is a fifth schematic diagram showing a part of the structure of the array substrate provided during its manufacturing process according to some embodiments of the present disclosure.

As shown in FIG. 12D, on the entire surface including the gate electrode 7, a SiO$_2$ film and a SiN film are sequentially deposited by PECVD to form an interlayer insulating layer 8. The interlayer insulating layer 8 is etched through a masking and etching process to form a source electrode contact hole 15 and a drain electrode contact hole 16. As shown in FIG. 12E, one or more low-resistance metal films are deposited by magnetron sputtering on the interlayer insulating layer 8 and the source electrode contact hole 15 and the drain electrode contact hole 16, and a source electrode 9 and a drain electrode 10 are formed through masking and etching processes. In this way, the source electrode 9 and the drain electrode 10 comes in ohmic contact with the polysilicon active layer 4 through the source electrode contact hole 15 and the drain electrode contact hole 16, respectively. The doped ions in the polysilicon active layer 4 are activated by rapid thermal annealing or heat treatment furnace annealing such that an effective conductive channel is formed in the polysilicon active layer 4 under the gate electrode 7. The source and drain metal film may be a single-layer metal film such as Al, Cu, Mo, Ti or AlNd, or may be a multilayer metal film such as Mo/Al/Mo or Ti/Al/Ti.

Figure 12F:
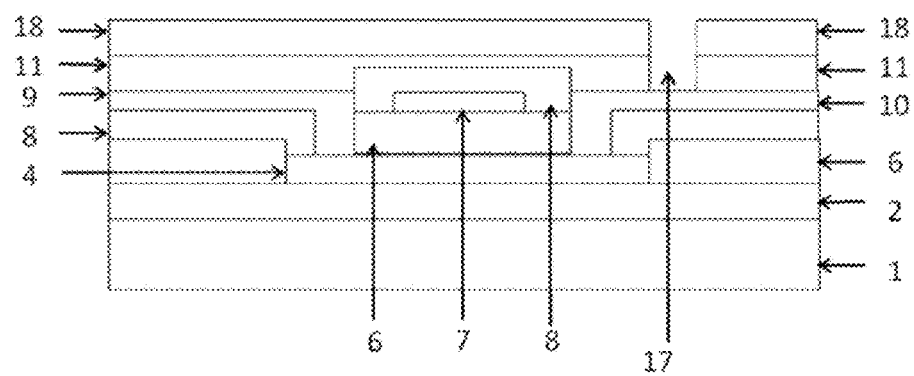
FIG. 12F is a sixth schematic diagram showing a part of the structure of the array substrate provided during its manufacturing process according to some embodiments of the present disclosure.

As shown in FIG. 12F, a layer of a SiN film is deposited on the entire surface including the source electrode 9 and the drain electrode 10 by PECVD, and a passivation layer 11 including a via hole 17 is formed by a masking and etching process. By means of a hydrogenation process by rapid thermal annealing or heat treatment furnace annealing, defects in the interior and interface of the polysilicon active layer 4 are repaired. Through another masking process, an organic planarization layer 18 having a same via hole as the via hole 17 is formed above the SiN passivation layer 11 to fill recesses on the surface of a device so as to form a flat surface.

Figure 12G:
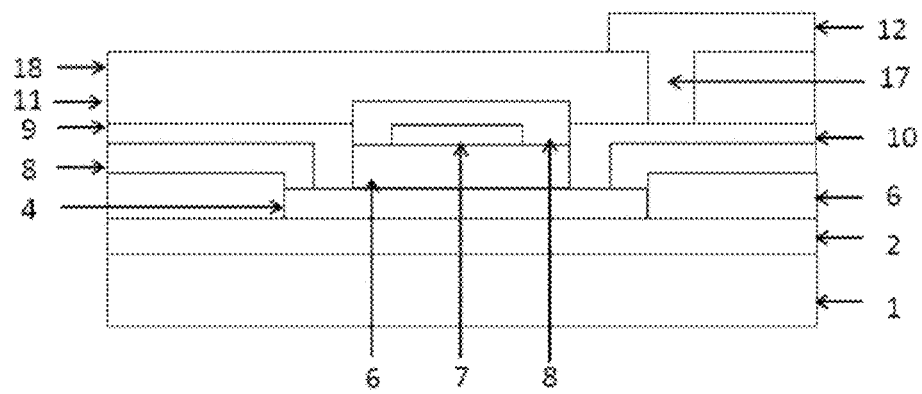
FIG. 12G is a seventh schematic diagram showing a part of the structure of the array substrate provided during its manufacturing process according to some embodiments of the present disclosure.

As shown in FIG. 12G, a layer of a transparent conductive film is deposited above the organic planarization layer 18 and the via hole 17 by magnetron sputtering, and then etched by a photolithographic process so as to form a pixel electrode 12 in a pixel region above the via hole 17 and a part of the organic planarization layer 18. Then, a layer of a photosensitive organic material similar to the organic planarization layer 18 is coated on the organic planarization layer 18 and the pixel electrode 12, and then subjected to a final masking process to expose a partial region of the pixel electrode 12 so as to form a pixel-defining layer 13 as shown in FIG. 11. The pixel-defining layer 13 covers the organic planarization layer 18 and the partial region of the pixel electrode 12. The transparent conductive film may be a single-layer oxide conductive film, such as ITO (indium tin oxide) or IZO (indium zinc oxide), or it may be a composite film such as ITO (indium tin oxide)/Ag/ITO or IZO (indium zinc oxide)/Ag.

As discussed above, at least eight (8) to nine (9) photolithographic processes are required to form the low temperature polysilicon field effect thin film transistor array substrate as shown in FIG. 11, including the polysilicon active layer, the doped storage capacitor, the gate electrode, the interlayer insulating layer contact hole, the source and drain electrodes, the passivation layer via hole, the planarization layer, and the pixel electrode formed through the photolithographic processes.

The above are some optional embodiments of the present disclosure. It should be noted that several improvements and modifications can be made by those of ordinary skill in the art, without departing from the principles described in the present disclosure. These improvements and modifications should also be considered as falling within the scope of this disclosure.

What is claimed is:

1. A touch display substrate, comprising:
    a base substrate, having a plurality of pixel regions arranged in the form of an array;
    a common electrode layer on the base substrate, divided into a plurality of self-capacitive electrodes independent from each other, an orthogonal projection of each of the self-capacitive electrodes on the base substrate covering more than one of the pixel regions;
    a plurality of touch data lines, arranged in a different layer from the self-capacitive electrodes and each connected with a corresponding one of the self-capacitive electrodes, orthogonal projections of the touch data lines on the base substrate being located within gaps between the plurality of pixel regions; and
    a touch detection chip, connected with each of the self-capacitive electrodes through a corresponding one of the touch data lines, and configured to load a common electrode signal to each of the self-capacitive electrodes in a display period through the corresponding touch data line, and to determine a touch position in a touch period by detecting a change in a capacitance of each of the self-capacitive electrodes through the corresponding touch data line,
    wherein each of the self-capacitive electrodes comprises a plurality of first hollowed-out portions and a plurality of second hollowed-out portions, which are evenly distributed, and first orthogonal projections of the plurality of second hollowed-out portions on the base substrate are located within second orthogonal projections which are orthogonal projections of the data lines and the touch data lines on the base substrate, and orthogonal projections of the first hollowed-out portions on the base substrate are located within areas where the pixel regions are.

2. The touch display substrate according to claim 1, wherein the base substrate comprises a plurality of gate lines and a plurality of data lines, the plurality of gate lines and the plurality of data lines intersect to define the plurality of pixel regions, two of the gate lines are arranged between two adjacent rows of the pixel regions, two columns of the pixel regions are located between two adjacent ones of the data lines, and each column of the pixel regions is provided with one of the data lines on one side and with one common electrode line, which is also used as the touch data line, on the other side.

3. The touch display substrate according to claim 2, wherein the touch data lines are in a same layer as the data lines, and an extension direction of the touch data line is substantially the same as an extension direction of the data line.

4. The touch display substrate according to claim 1, wherein the base substrate comprises a plurality of gate lines and a plurality of data lines, the plurality of gate lines and the plurality of data lines intersect to define the plurality of pixel regions, one of the gate lines is arranged between two adjacent rows of the pixel regions, one of the data lines and one of the touch data lines are arranged between two adjacent columns of the pixel regions, and the touch data lines are also used as common electrode lines.

5. The touch display substrate according to claim 4, wherein the touch data lines are in a same layer as the data lines, and an extension direction of the touch data line is substantially the same as an extension direction of the data line.

6. The touch display substrate according to claim 1, further comprising:
dummy touch data lines which are arranged in parallel with and in a same layer as the touch data lines, and each of the touch data lines corresponds to one of the dummy touch data lines.

7. The touch display substrate according to claim 1, wherein at least two of the touch data lines are shorted by means of a connection line which is located outside a display region.

8. The touch display substrate according to claim 1, wherein the first hollowed-out portion and the second hollowed-out portion have a same shape, and both of them are of a strip structure extending along a direction substantially parallel to an extension direction of the data line.

9. The touch display substrate according to claim 1, wherein the touch display substrate is a display substrate of an incell self-capacitive liquid crystal display (LCD).

10. A touch display device, comprising:
an incell self-capacitive touch display substrate comprising:
a base substrate, having a plurality of pixel regions arranged in the form of an array;
a common electrode layer on the base substrate, divided into a plurality of self-capacitive electrodes independent from each other, an orthogonal projection of each of the self-capacitive electrodes on the base substrate covering more than one of the pixel regions;
a plurality of touch data lines, arranged in a different layer from the self-capacitive electrodes and each connected with a corresponding one of the self-capacitive electrodes, orthogonal projections of the touch data lines on the base substrate being located within gaps between the plurality of pixel regions; and
a touch detection chip, connected with each of the self-capacitive electrodes through a corresponding one of the touch data lines, and configured to load a common electrode signal to each of the self-capacitive electrodes in a display period through the corresponding touch data line, and to determine a touch position in a touch period by detecting a change in a capacitance of each of the self-capacitive electrodes through the corresponding touch data line,
wherein each of the self-capacitive electrodes comprises a plurality of first hollowed-out portions and a plurality of second hollowed-out portions, which are evenly distributed, and first orthogonal projections of the plurality of second hollowed-out portions on the base substrate are located within second orthogonal projections which are orthogonal projections of the data lines and the touch data lines on the base substrate, and orthogonal projections of the first hollowed-out portions on the base substrate are located within areas where the pixel regions are.

11. The touch display device according to claim 10, wherein the base substrate comprises a plurality of gate lines and a plurality of data lines, the plurality of gate lines and the plurality of data lines intersect to define the plurality of pixel regions, two of the gate lines are arranged between two adjacent rows of the pixel regions, two columns of the pixel regions are located between two adjacent ones of the data lines, and each column of the pixel regions is provided with one of the data lines on one side and with one common electrode line, which is also used as the touch data line, on the other side.

12. The touch display device according to claim 11, wherein the touch data lines are in a same layer as the data lines, and an extension direction of the touch data line is substantially the same as an extension direction of the data line.

13. The touch display device according to claim 10, wherein the base substrate comprises a plurality of gate lines and a plurality of data lines, the plurality of gate lines and the plurality of data lines intersect to define the plurality of pixel regions, one of the gate lines is arranged between two adjacent rows of the pixel regions, one of the data lines and one of the touch data lines are arranged between two adjacent columns of the pixel regions, and the touch data lines are also used as common electrode lines.

14. The touch display device according to claim 13, wherein the touch data lines are in a same layer as the data lines, and an extension direction of the touch data line is substantially the same as an extension direction of the data line.

15. The touch display device according to claim 10, further comprising:
dummy touch data lines which are arranged in parallel with and in a same layer as the touch data lines, and each of the touch data lines corresponds to one of the dummy touch data lines.

16. The touch display device according to claim 10, wherein at least two of the touch data lines are shorted by means of a connection line which is located outside a display region.

17. The touch display device according to claim 10, wherein the first hollowed-out portion and the second hollowed-out portion have a same shape, and both of them are of a strip structure extending along a direction substantially parallel to an extension direction of the data line.

18. The touch display device according to claim 10, wherein the touch display substrate is a display substrate of an incell self-capacitive liquid crystal display (LCD).

* * * * *